Patented Sept. 21, 1926.

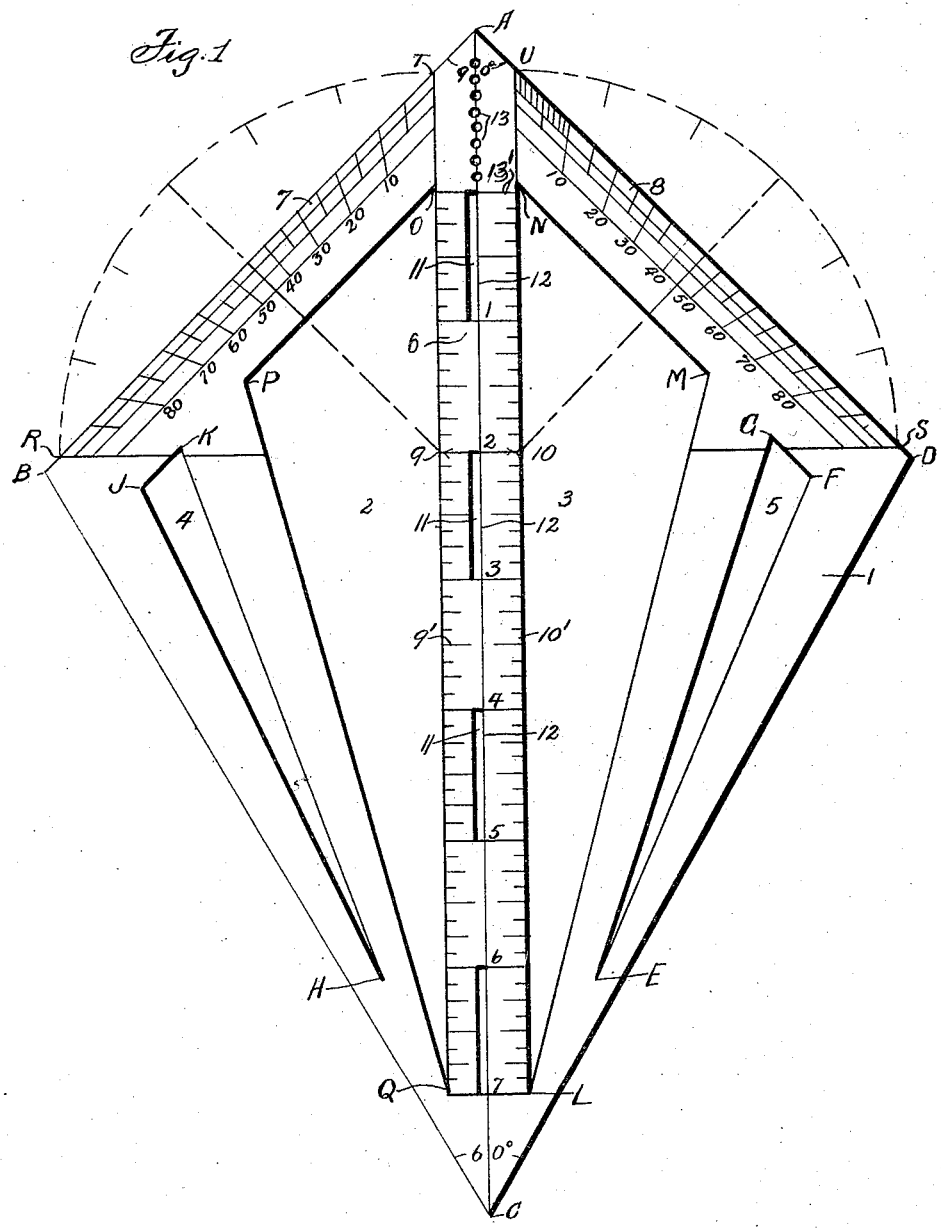

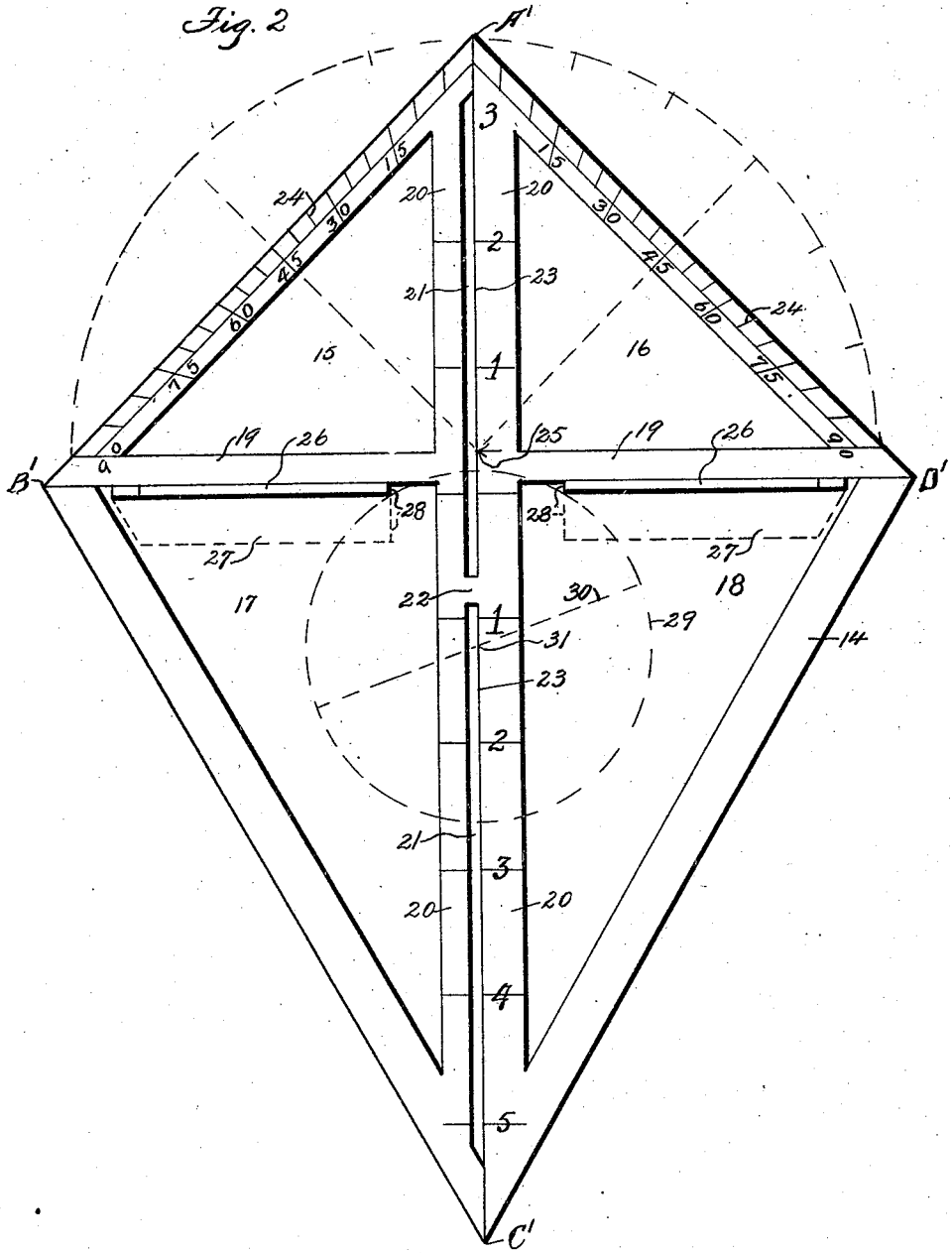

1,600,666

UNITED STATES PATENT OFFICE.

JOSEPH DUGAN, OF LOS ANGELES, CALIFORNIA, ASSIGNOR TO LOUISA DUGAN, OF LOS ANGELES, CALIFORNIA.

PROTRACTOR POLYGON.

Application filed October 20, 1925. Serial No. 63,663.

The invention forming the subject matter of this application is designed to replace ordinary drafting triangles in common use; and to combine in a single instrument extremely simple and efficient means for setting off angles of any desired degree, bisecting and doubling angles, finding centers of arcs, and for drawing circles.

In the drawing:—

Figure 1 is an elevation of one face of the protractor-polygon; and

Figure 2 is an elevation of a modification thereof.

As shown in Fig. 1, the instrument comprises a plate 1 of any desired material, preferably transparent. This plate 1 is cut to form a quadrilateral ABCD having the sides AB and AD equal to each other and at right angles to each other, and having the sides BC and CD equal to each other and at an angle of sixty degrees to each other. This arrangment of sides obviously makes the remaining angles of the quadrilateral equal to each other and equal to one hundred and five degrees.

Triangular portions 2, 3, 4, and 5 are cut out of the plate 1 symmetrically on opposite sides of a line joining the angles A and C. The triangles 2 and 3 have their sides OQ and NL parallel to the line 12 bisecting the angles A and C, their sides QP and LM inclined at an angle of fifteen degrees to line 12, and their sides PO and MN parallel to the quadrilateral sides BA and DA, respectively.

The triangular portions 4 and 5 are also cut out of the plate 1 symmetrically of the center line AC, and have the sides EF and JH inclined at an angle of five degrees to the sides CD and CB, respectively of the quadrilateral; with the sides HK and EG inclined at an angle of five degrees to the sides JH and EF, respectively, the sides KJ and GF being parallel to sides AB and AD, respectively.

The quadrilateral sides AB and AD are each provided with protractor scales 7 and 8 having their respective centers 9 and 10 lying in the edges of the sides OQ and NL, respectively, of the rule member 6. Each scale is included in a quadrant of a circle; the scale 7 beginning at the point T in alinement with the line OQ and ending at the point R, spaced slightly away from the angle B; and the scale 8 beginning at the point U in alinement with line LN and ending at the point S, spaced away from the angle D. The two arcs have the same length radius and are symmetrically placed relative to the center line AB.

Slots 11 are cut in the member 6 and have their edges 12 in alinement with the line AC, and scales 9' and 10' are provided on opposite sides of the member 6. A series of apertures 13 are formed on the line AC between the point A and the starting line 13' of the scales. As shown in Fig. 1, the slots 11 are each one inch in length and are arranged between alternate inch graduations. The center of the aperture of the series 13 nearest the line 13' is spaced one-eighth of an inch therefrom and the center of each aperture is similarly spaced from the centers of the adjacent apertures.

Particular attention is directed to the fact that all the elements of this protractor-polygon, with the single exception of the slots 11, are symmetrically arranged on opposite sides of the line AC and are identical in every respect. This symmetry of parts obviates all necessity for flopping the polygon from one face to another in setting off lines inclined in opposite directions to a common reference line.

Assuming the side CD as positioned against the edge of a T-square blade, it will be obvious from the geometry of the figure that lines EF, EG, LM, LN or QO, QP, HK, HJ, and CB are inclined, respectively, at angles of five, ten, fifteen, thirty, forty-five, fifty, fifty-five, and sixty degrees to side CD or the edge of the T-square blade, and that the edge AD is inclined at an angle of seventy-five degrees to said blade. With the side AD against the T-square blade, the lines AB, BC, JH, KH, PQ, OQ, or NL, ML, GE, FE, and DC will be inclined, respectively, at angles of ninety, fifteen, twenty, twenty-five, thirty, forty-five, sixty, sixty-five, seventy, and seventy-five degrees to the edge of the T-square blade. This means that fourteen angles between zero and ninety degrees can be set off directly in either direction relative to a T-square blade without turning the polygon from one face to the other. The supplements of all these angles can of course, be set off, giving twenty-seven angles that can be set off directly by this single simple instrument as compared with the eleven angles that can be set off by all possible combinations of the usual forty-five-ninety and thirty-sixty-ninety degree triangles.

The symmetrical arrangement of the protractor scales relative to the line AB adapts the instrument for bisecting lines, for bisecting and doubling angles, and for drawing the diameters of circles and arcs and finding the centers thereof. The protractor scales may be used in the ordinary way by pricking off points. It is preferable to use them by positioning one of the center points 9 or 10 at the point in a given line through which a line is to be drawn at any desired angle, then swing the polygon around this point until the desired graduation mark on the scale 7 or 8 coincides with the given line, in which position a line may be drawn along the edge of the member 6 through the point and at the desired angle indicated by the graduation on the protractor scale.

The invention is not to be considered as limited in any way to any specific number of triangular cut-outs in the plate 1, as the arrangement shown in the drawing was selected mainly to keep the instrument within reasonable bounds of simplicity, and to give the maximum working lengths of ruling edges consistent with the size of the instrument. The big inventive idea lies in the symmetry of the parts relative to the center line of quadrilateral, and it is this symmetry that gives the extremely simple instrument so many uses.

The peculiar arrangement of the ruling member 6 with respect to the protractor scales makes it the equivalent in working capabilities of a much larger protractor of the usual type.

The instrument shown in Figure 2 is designed more as a working tool for use by artisans and in manual training schools. As shown, it comprises a sheet 14 of material stamped out to form a quadrilateral A'B'C'D' similar to the quadrilateral ABCD. Triangular portions 15, 16, 17 and 18 are cut out of this sheet 14 to leave stiffening plates 19 connecting the angles B' and D' to the center ruling member 20. This ruler member 20 is provided with a slot 21, divided by a stiffening bar 22, having the straight edge 23 line in the line A'C'. Protractor scales 24 are provided on the sides A'B' and A'D', and have their common center at the point 25 in the edge 23 of the slot 21.

In order to adapt this polygon for edge contact with a board or other object, flanges 26 are stamped up from sheet 14 at right angles to the plane of the sheet. The approximate shapes of these flanges are shown by the developed outlines 27 thereof, and the flanges terminate at the points 28 equidistant from the edge 23 of the slot 21, to give the instrument the function of a "center-square". Its use for this purpose will be obvious from the drawing, in which the edge 23 of the instrument as applied to a circle 29 is shown as intersecting the diameter 30, previously drawn by edge 23, at the center 31.

The expression "drafting polygon", as used in the claims of this application, refers to a plate of thin material, or its framed equivalent, having straight-edged cut-out or formed portions, providing straight ruling edges fixed at various angles to each other, and incapable of movement relative to each other.

I claim:—

1. A drafting polygon having four straight edges arranged to form a quadrilateral, the interior angles of which are angles of sixty, ninety, and one hundred and five degrees.

2. A drafting polygon having four straight edges arranged to form a quadrilateral of which two sides are equal to each other and are arranged at an angle of ninety degrees to each other and of which the two remaining sides are equal to each other and are arranged at an angle of sixty degrees to each other.

3. A drafting polygon as set forth in claim 1 and having a triangular portion cut out and providing three straight ruling edges forming a triangle the interior angles of which are angles of thirty, forty-five, and one hundred and five degrees.

4. A drafting polygon having four straight edges arranged to form a quadrilateral having two of its sides equal and arranged at an angle of sixty degrees to each other and its two remaining sides equal and arranged at an angle of ninety degrees to each other and also having portions thereof cut out to provide a ruler member extending between said angles and having straight ruling edges parallel to a line joining and bisicting each of said angles.

5. A drafting polygon including a straight edged ruler and a pair of rulers extending symmetrically from opposite sides of said ruler and having similar protractor scales symmetricaly arranged thereon relative to said ruler and having their centers lying on opposite edges of said ruler.

6. A drafting polygon shaped as a quadrilateral having two of its adjacent sides equal to each other and having a ruler member provided with a center line bisecting the angle between said sides and also provided with slots each of which has a straight edge coincident with said line.

7. A drafting polygon shaped as a quadrilateral having two of its adjacent sides equal to each other and the other two sides equal to each other but of different lengths from the first named sides, said quadrilateral being provided with a slot having a straight edge coincident with a line bisecting the angles between each of the two pairs of adjacent sides.

8. A drafting polygon as set forth in claim 4 in which the cut out portions are triangular and similar and are symetrically arranged on each side of said bisecting line to form ruling straight edges arranged at angles of fifteen and thirty degrees to each of the polygon sides which are arranged at an angle of sixty to each other.

In testimony whereof I have signed my name to this specification.

JOSEPH DUGAN.